Inventor:
Dieter Petzold
By: Spencer & Kaye
Attorneys

March 26, 1968     D. PETZOLD     3,375,350
STATIC COUNTER HAVING MAIN AND AUXILIARY STORES
Filed March 16, 1965     7 Sheets-Sheet 6
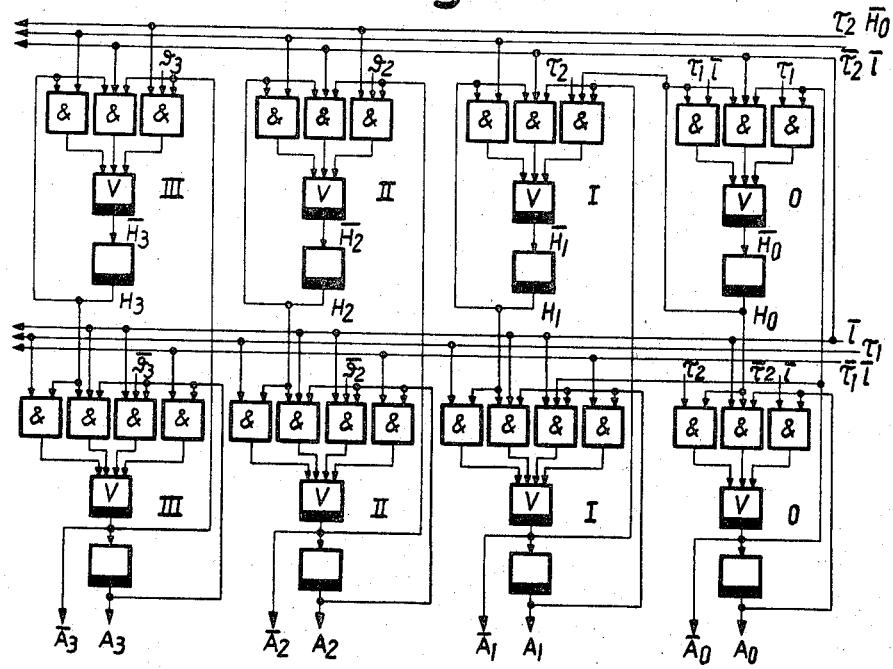
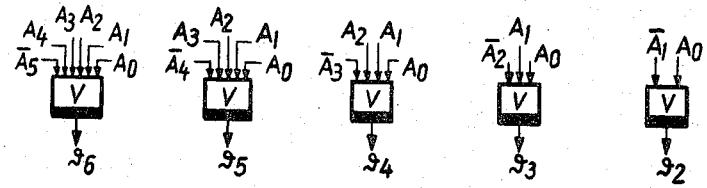
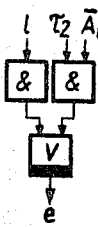
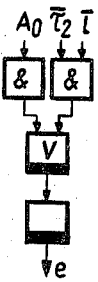
Inventor:
Dieter Petzold
By: Spencer & Kaye
Attorneys March 26, 1968  D. PETZOLD  3,375,350
STATIC COUNTER HAVING MAIN AND AUXILIARY STORES
Filed March 16, 1965  7 Sheets-Sheet 7
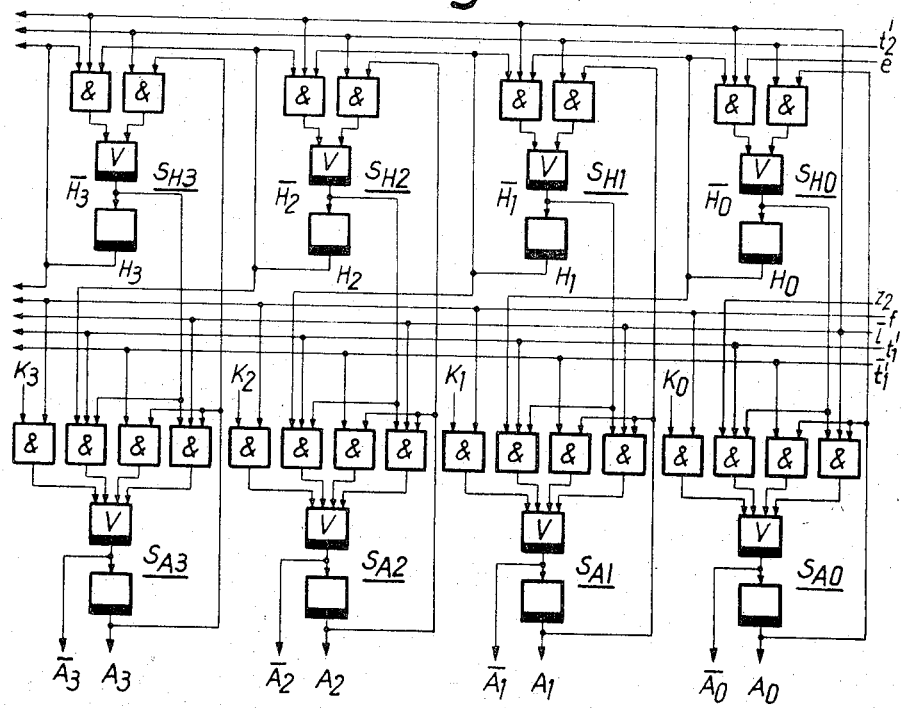
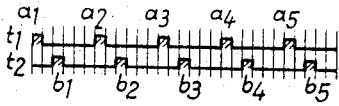
Fig. 13a
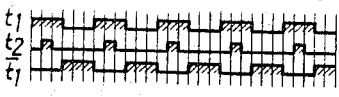
Fig. 13b
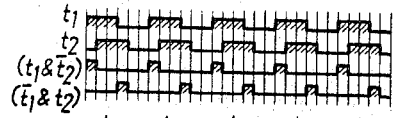
Fig. 13c
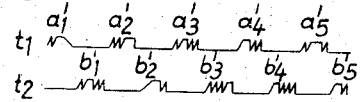
Fig. 13d
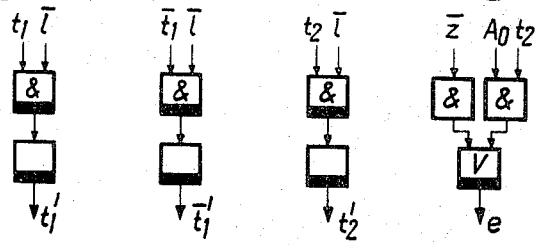
Fig. 14a  Fig. 14b  Fig. 14c  Fig. 14d
Inventor:
Dieter Petzold
By: Spencer & Kaye
Attorneys

United States Patent Office 3,375,350
Patented Mar. 26, 1968

3,375,350
STATIC COUNTER HAVING MAIN AND AUXILIARY STORES
Dieter Petzold, Berlin-Neukolln, Germany, assignor to Licentia Patent-Verwaltungs-G.m.b.H., Frankfurt am Main, Germany
Filed Mar. 16, 1965, Ser. No. 440,157
Claims priority, application Germany, Mar. 20, 1964, L 47,348
16 Claims. (Cl. 235—92)

ABSTRACT OF THE DISCLOSURE

A static counter for counting forward or backward and controlled by timely staggered counting signals and auxiliary counting signals. The counter has a plurality of counter stages each incorporating a main store and an auxiliary store, the instants at which each main store is set and erased being fixed by the associated auxiliary store, with each auxiliary store being in one binary condition for setting the associated main store and in the opposite binary condition for erasing the associated store. The input of each main store is connected directly to its respective associated store and to all of the preceding main stores, and the input of each auxiliary store is connected to the respective associated main store, to all of the preceding main stores, except, in certain cases, the lowest-order store, and to the lowest-order auxiliary store.

---

The present invention relates to static counters and, more particularly, to static counters operating in the Gray code.

Basically, the present invention relates to a static counter, capable of counting forward or backwards, which counter is controlled by counting signals and auxiliary counting signals of any desirable wave form, the timed relationship between the auxiliary counting signals and the counting signals being such that the auxiliary counting signals are staggered with respect to the counting signals. The counter itself comprises a plurality of binary stages, and each binary stage incorporates two memory units, namely, a main storage unit or so-called main store which puts out the signal of the particular digit and an auxiliary storage unit or so-called auxiliary store which coacts with the main store. The main stores put out the result of the forward or backward counting operation, either in natural binary form or in natural binary encoded decimal form.

For certain types of data processing systems or the like, it is desirable that the count be put out not in natural binary form or in natural binary encoded decimal form, but in a cyclic code, as, for example, the Gray code. As is well known in the computer art, the Gray code is a unit-distance code, namely, a code in which there is a single-digit change between successive numbers, as follows:

| Decimal: | Gray code |
|---|---|
| 0 | 0000 |
| 1 | 0001 |
| 2 | 0011 |
| 3 | 0010 |
| 4 | 0110 |
| 5 | 0111 |
| 6 | 0101 |
| 7 | 0100 |
| 8 | 1100 |
| 9 | 1101 |
| 10 | 1111 |
| 11 | 1110 |
| 12 | 1010 |
| 13 | 1011 |
| 14 | 1001 |
| 15 | 1000 |

There exist counters which themselves operate in natural binary code, and whose output is applied to a separate converter which converts the count, which is in natural binary form, into the Gray code. The drawback of such an arrangement is that this converter materially increased the costs and complexity of the counting arrangement as a whole.

It is, therefore, the primary object of the present invention to provide a counting arrangement which overcomes the above drawback, and, with this object in view, the present invention resides, basically, in a static counter which operates directly in the Gray code.

The counter itself is based on the arrangement shown in co-pending application Ser. No. 327,585, filed Nov. 29, 1963, which counter is made up of stores in the form of logic circuits in which the condition or state of the output signal is determined exclusively from the combination of states of the input signals and the fed back output signal, the form of the signal being any desired shape. If one input signal changes, the new output state is derived from the output state prevailing up to then and from the new input states. The manner in which this change occurs, i.e., the steepness of the slope of the flank of the signal, has no influence. The circuit is controlled by voltage signals which have assigned to them either of the two binary values 0 and L, the character "L" being used to represent the binary "1." Whether a signal is to be considered a 0-signal or an L-signal depends solely on its amplitude. The counter is controlled by counting signals and auxiliary counting signals of any suitable wave form, the counting and auxiliary counting signals being timely staggered and, as explained above, each binary digit or stage of the counter incorporates a main store and an associated auxiliary store, the instants at which the main stores are set and erased being controlled by the corresponding auxiliary store which, at the erasing and setting instants, has different states and by at least one counter stage of the preceding binary digits or a counting signal or an auxiliary counting signal. According to the present invention the main and auxiliary stores are connected to each other such that, with each counting step (i.e., upon the application of a counting or auxiliary counting signal) exactly one main store changes its state.

According to a further feature of the present invention, each counting stage is controlled by all of the preceding counting stages.

Additional objects and advantages of the present invention will become apparent upon consideration of the following description when taken in conjunction with the accompanying drawings in which:

FIGURE 8 is a schematic circuit diagram of yet another embodiment of a backward counting Gray code counter in accordance with the present invention.

FIGURES 10a, 10b, 10c, 10d and 10e are schematic circuit diagrams of means for producing signals used in conjunction with the counters of FIGURES 4 and 8.

FIGURES 11a and 11b are schematic circuit diagrams of means for producing a signal applied to the auxiliary store of the lowest-order counter stage, which enables the number of inputs of all circuits of the counter to be kept within certain limits.

FIGURE 12 is a schematic circuit diagram of a natural binary code counter of the type shown in application Serial No. 327,585, thereby to facilitate explanation of the present invention relating to Gray code counters.

FIGURES 13a, 13b, 13c and 13d are time plots showing the timed relationship between various signals in the counter of FIGURE 12.

FIGURES 14a, 14b, 14c and 14d are, respectively, schematic circuit diagrams of means for producing signals used in the counter of FIGURE 12.

Figure 1:
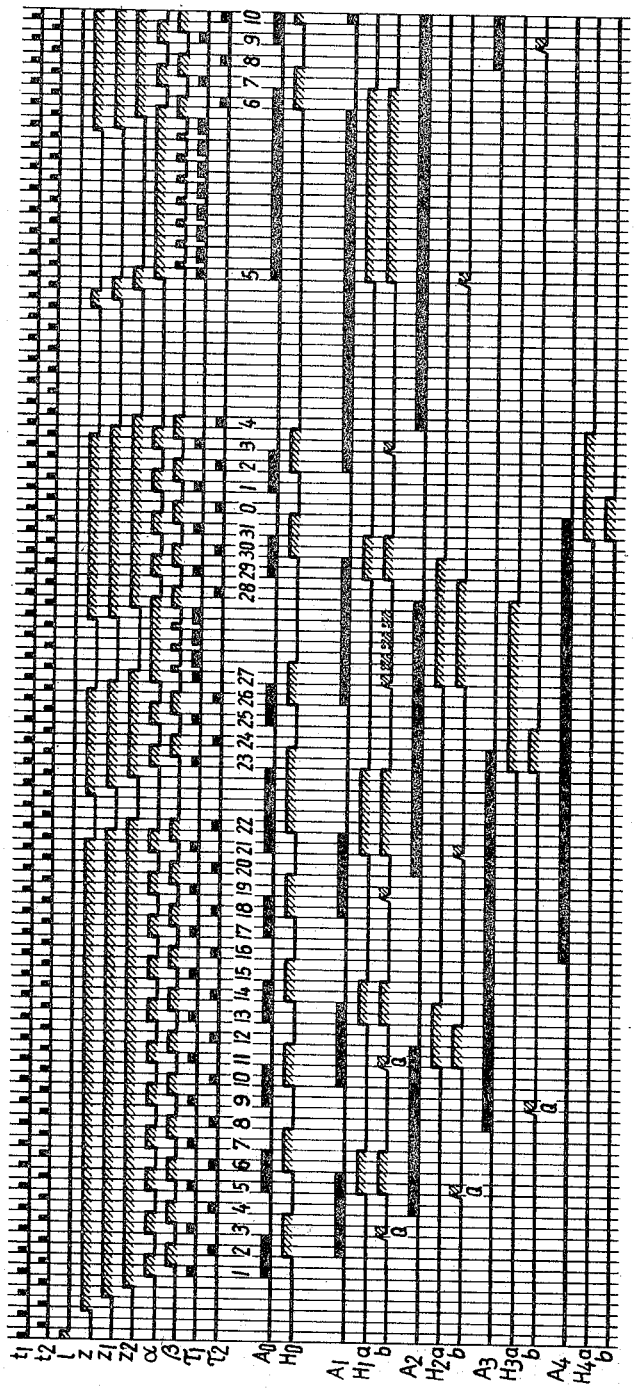
FIGURE 1 is a time plot showing the timed relationship between the various signals used to control a forward counting Gray code counter in accordance with the present invention, and the signals put out by the counter.

In each of the various circuit diagrams, the AND-circuits are identified by "&" (in some cases with subscripts) and the OR-circuits by "v," and in each case the black bar represents the presence of an inverse or complement, i.e., a negated, output. Various ones of the circuits also include pure inverter or so-called NOT-circuits, these being circuits at which the output is the inverse, that is to say, the negate, or complement, of the input, namely, 0 when the input is L, and L when the input is 0.

In the time plots, only the affirmative signals are shown, in the interests of simplicity and clarity. That is to say that, for example, only the signals $t_1$ but not the negates $\bar{t}_1$ thereof, are shown. Also, the signals are shown as having a rectangular wave form although in practice the wave form need not, as explained in application Serial No. 327,585, necessarily be square. As a matter of expediency, the abscissa of each signal represents the value 0 while the lines overlying the abscissa represent the binary "one" or L.

For purposes of explanation, reference will be made to the static counter shown in application Ser. No. 327,585, one embodiment of which is depicted in FIGURE 12 of the accompanying drawings. FIGURE 12 shows the first four counter stages of a binary counter made up of identical counter stages, each incorporating a main store $S_A$ and an auxiliary store $S_H$. Each store is identified by an appropriate subscript, e.g., $S_{A1}$, $S_{H2}$. The stores are constituted by input AND-circuits whose outputs are connected to OR/NOT/NOT-circuits. All of the stores are galvanically coupled to each other. The configuration or wave shape of the applied input signals is of no consequence; all that is necessary is that the input signals have certain predetermined amplitudes.

There will now be described the operation of the counters as well as the significance of the various signals.

The counter has applied to it the actual counting signals $t_1$ as well as auxiliary counting signals $t_2$, the signals $t_1$ and $t_2$ being staggered or time-shifted with respect to each other, i.e., the signals $t_1$ and $t_2$ occur at different times and, as shown graphically in FIGURE 13a, there are time intervals between the signals $t_1$ and $t_2$. The signals themselves, as well as the time intervals therebetween, may be of different durations. If the timed relationship between the signals $t_1$ and $t_2$ is as depicted in FIGURE 13b, $t_2$ can be used as the counting signal and $\bar{t}_1$ as the auxiliary counting signal. If the timed relationship between the signals $t_1$ and $t_2$ is as shown in FIGURE 13c, two AND-circuits can be used for producing two signals ($t_1$ & $\bar{t}_2$) and ($\bar{t}_1$ & $t_2$) which are staggered with respect to each other and between which there is a time interval. The repeated disappearance and reappearance of the $t$-signals—as depicted in FIGURE 13d and as might be produced by shocks or vibrations to which the pulse generator is subjected—will not adversely influence the operation. The signal trains identified in FIGURE 13d at $a_i'$ will each be considered, by the counter, as one counting signal, comparable to the signals $a_i$ of FIGURE 13a. The same applies to the signal trains $b_i'$, each of which will be considered by the counter as an auxiliary counting signal.

The A-signals represent the number of counting signals $t_1$ registered by the counter. The H-signals are auxiliary signals which are formed by the counter itself and which assist the function of the counter. As explained above, the A-signals and H-signals of the binary counter are identified by subscripts. The signal $A_i$ of the binary counter thus has the value $2^i$.

Before the start of a counting operation, the counter is put into a definite starting position by means of an erase or reset signal 1=L. During the counting operation, the reset signal 1=0. For purposes of simplification, those signals which in each counter stage together act on one AND-stage, are separately combined. The counters therefore have applied to them $t'$-signals which are derived from the $t$-signals and the negated reset signal $\bar{1}$ by means of the circuits shown in FIGURES 14a, 14b and 14c. The $e$-signal produced by the circuit of FIGURE 14d is provided solely so that the auxiliary store of the counter stage of the lowest order is constituted by circuitry similar to that of the auxiliary stores of the higher-order counter stages. The circuit shown in FIGURE 14d comprises two input AND-circuits whose outputs are connected to an OR/NOT-circuit. One of the AND-circuits has applied to it the negate of a counting command signal z by means of which the counter is made to count (when z=L) or not to count (when z=0). (The single input AND-circuit just referred to, as well as other single-input logic circuits which are part of circuitry referred to throughout the following description, are provided for purposes of electrical symmetry.) The other AND-circuit has applied to it the signals $A_0$ and $t_2$. The signal $z_1$ is derived from the z-signal, which may appear at any time, and a signal $z_2$ is derived from the signal $z_1$, such that $z_2$ can change its state only at the start of an auxiliary counting signal $t_2$, as explained in the mentioned application Serial No. 327,585, .e., $(z\&t_1\&\bar{1})v(z_1\&z\&\bar{1})v(z_1\&\bar{t}_1\&\bar{1})=z_1$ and $(z_1\&t_2)v(z_2\&z_1)v(z_2\&\bar{t}_2\&\bar{1})=z_2$. The signal $z_2$ serves as a clear-for-counting signal, i.e., the $t_1$-signal are counted only so long as $z_2$=L. So long as $z_2$=0, the counter remains at whatever count it has reached. The counter can be preset to any desired starting number by means of preset signals $k$, the same being identified by subscripts and superscripts in a manner analogous to that in which the A and H signals are identified, as explained above. The $k$-signals are accepted by the counter when a clear-for-presetting signal $f=L$. Since the $f$-signal disappears at the start of the counting operation, a new number to which the counter may later be preset can be made ready during the counting operation. If no presetting is required, the means by which the presetting is accomplished can be dispensed with.

Figure 9:
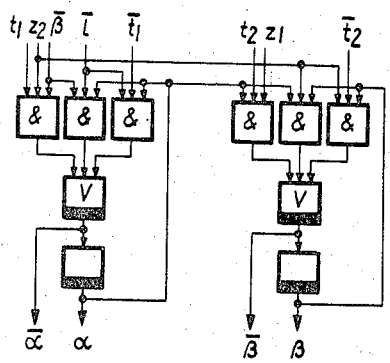
FIGURE 9 is a schematic circuit diagram of a divider stage which produces control signals applied to the Gray code counter according to the present invention.

The counter according to the present invention differs from the counter of FIGURE 12 in that the main and auxiliary stores are connected to each other with means which enable the counter to operate directly according to the Gray code. FIGURE 1 shows that such a counter has applied to it the counting signals $t_1$, i.e., the signals which are to be counted, as well as the corresponding auxiliary counting signals $t_2$, these signals being so timed that their state does not change simultaneously. FIGURE 1 also shows that there are time intervals between the signals. When these signals $t_1$, $t_2$, are to be applied to a Gray code counter according to the present invention, they are not applied directly to the counter but to a divider stage which precedes the lowest-order counter stage. Such a divider stage is shown in FIGURE 9 and divides the signals $t_1$, $t_2$, by the ratio 2:1. The divider stage itself is not a counter stage and does not partake of the count which is put out.

As is apparent from FIGURE 9, the divider stage is essentially similar to the counter stage to which the clear-for-counting signal $z_2$ is applied, as described in application Ser. No. 327,585, so that the Gray code counter, too, can be interrupted at any desired instant. The right-hand portion of the time plot of FIGURE 1 shows a number of such interruptions in the counting operation. The divider stage of FIGURE 9 puts out signals $\alpha$, $\beta$, and their negates $\bar{\alpha}$, $\bar{\beta}$.

The time plot of FIGURE 1 also shows that the signals $\alpha$, $\beta$, overlap. The signals $\alpha$, $\beta$, are used to form further signals $\tau_1$, $\tau_2$, there being time intervals between these signals. These signals $\tau_1$, $\tau_2$, are longer than the signals $t_1$, $t_2$, which are applied to the divider stage, and appear only half as often. The signals $\tau_1$, $\tau_2$, can be derived from the output signals $\alpha$, $\beta$, of the divider stage in any suitable fashion, as, for example, by means of AND-circuits, which are so connected that $\tau_1$ is formed by the signals $\alpha$ and $\bar{\beta}$ and that $\tau_2$ is formed by $\bar{\alpha}$ and $\beta$. Suitably, the AND-circuits which form the signals $\tau$ also have the negated erase signal $\bar{1}$ applied to them.

The signals $\tau_1$, $\tau_2$, are used to control the main and auxiliary stores which constitute the Gray code counter. The counter changes its count with the appearance of each $\tau$ signal. That is to say, the counter changes its count not only upon the application of one of the $\tau_1$ signals but also upon the application of one of the $\tau_2$ signals, as is apparent from the time plot of FIGURE 1.

As before, the output signals of the main and auxiliary stores are referenced A and H, respectively, the subscripts representing the particular binary digit.

FIGURE 1 also shows that only one of the A-signals changes at each count. When the count is "1," there appears the signal $A_0$. When the count progresses to "2," the signal $A_0$ is still present and there also appears the signal $A_1$. At the count of "3," signal $A_1$ remains but the signal $A_0$ disappears.

The H-signals are staggered, timewise, with respect to the A-signals and determine the appearance and disappearance of the A-signals.

The time plot shows two solutions, i.e., two ways $(a)$ and $(b)$ in which the auxiliary signals may change. For $(b)$, signals $Q$ may appear temporarily which, however, do not interfere with the operation. Depending on the design of the counter, they may appear as short signals which do not change the count, as needle pulses, or not at all.

In the case $(a)$, the H-signals last longer than the H-signals in case $(b)$. The instants at which the H-signals appear for both $(a)$ and $(b)$ will be the same. The particular circuitry will be described in greater detail below.

Figure 2:
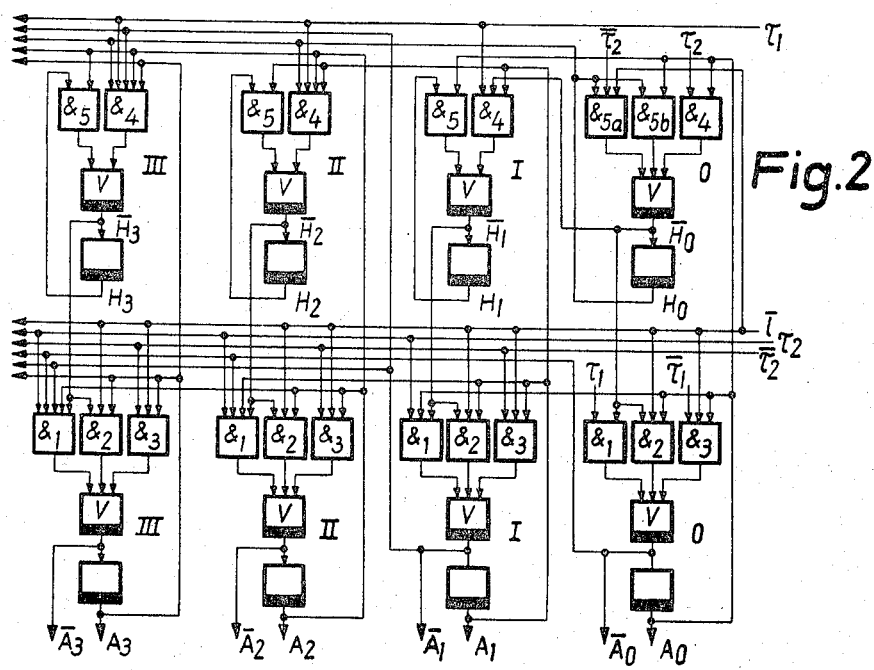
FIGURE 2 is a schematic circuit diagram showing one embodiment of a forward counting Gray code counter in accordance with the present invention.

FIGURE 2 is a block circuit diagram of one embodiment of a Gray code counter according to the present invention, the same being a forward counting counter whose main and auxiliary stores form a circuit which operates in accordance with the following logic functions:

Setting condition | Holding condition
--- | ---
$(\tau_1 \& \bar{H}_0)$ | $v \ (A_0\&\bar{H}_0\&\bar{1})v(A_0\&\bar{\tau}_1\&\bar{1}) = A_0$
$(\tau_2\&\bar{H}_1\&A_0)$ | $v \ (A_1\&\bar{H}_1\&\bar{1})v(A_1\&\bar{\tau}_2\&\bar{1}) = A_1$
$(\tau_2\&\bar{H}_2\&A_1\&\bar{A}_0)$ | $v \ (A_2\&\bar{H}_2\&\bar{1})v(A_2\&\bar{\tau}_2\&\bar{1}) = A_2$
$(\tau_2\&\bar{H}_3\&A_2\&\bar{A}_1\&\bar{A}_0)$ | $v \ (A_3\&\bar{H}_3\&\bar{1})v(A_3\&\bar{\tau}_2\&\bar{1}) = A_3$
$(\tau_2\&\bar{H}_4\&A_3\&\bar{A}_2\&\bar{A}_1\&\bar{A}_0)$ | $v \ (A_4\&\bar{H}_4\&\bar{1})v(A_4\&\bar{\tau}_2\&\bar{1}) = A_4$
$(\tau_2\&\bar{H}_5\&A_4\&\bar{A}_3\&\bar{A}_2\&\bar{A}_1\&\bar{A}_0)$ | $v \ (A_5\&\bar{H}_5\&\bar{1})v(A_5\&\bar{\tau}_2\&\bar{1}) = A_5$
$(\tau_2\&A_0)$ | $v \ (H_0\&A_0)v(H_0\&\bar{\tau}_2\&\bar{1}) = H_0$
$(\tau_1\&A_1\&\bar{H}_0)$ | $v \ (H_1\&A_0) = H_1$
$(\tau_1\&A_2\&A_1\&H_0)$ | $v \ (H_2\&A_1) = H_2$
$(\tau_1\&A_3\&A_2\&\bar{A}_1\&H_0)$ | $v \ (H_3\&A_2) = H_3$
$(\tau_1\&A_4\&A_3\&\bar{A}_2\&\bar{A}_1\&H_0)$ | $v \ (H_4\&A_3) = H_4$
$(\tau_1\&A_5\&A_4\&\bar{A}_3\&\bar{A}_2\&\bar{A}_1\&H_0)$ | $v \ (H_5\&A_4) = H_5$ This circuitry produces the auxiliary signals for case $(a)$ in FIGURE 1.

Figure 3:
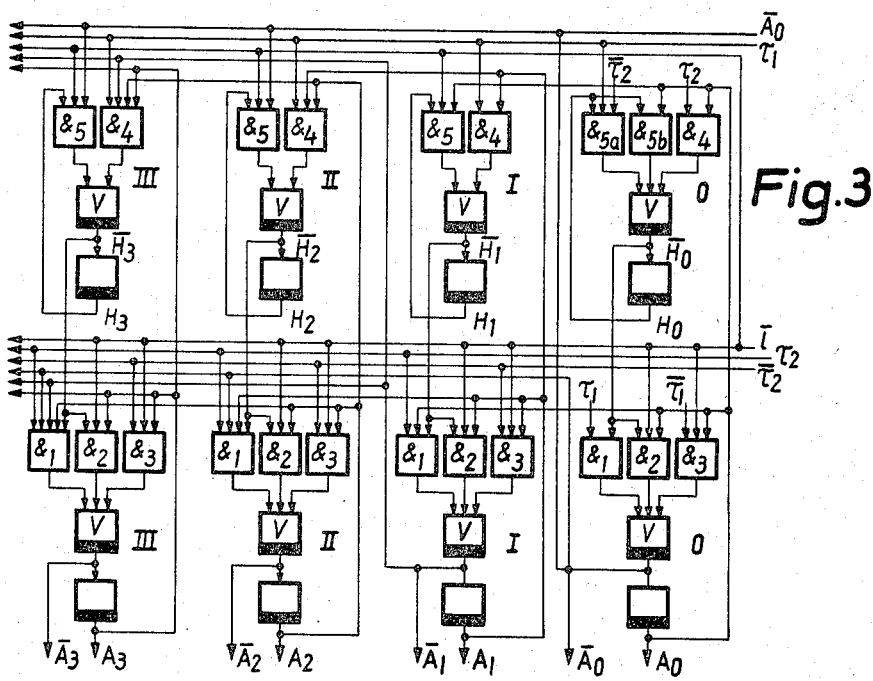
FIGURE 3 is a schematic circuit diagram showing another embodiment of a forward counting Gray code counter in accordance with the present invention.

FIGURE 3 shows four counter stages of a Gray code counter whose main stores have the logic function of the counter of FIGURE 2 and whose auxiliary stores having the following logic functions:

Setting condition | Holding condition
--- | ---
$(\tau_2\&A_0)$ | $v \ (H_0\&A_0)v(H_0\&\bar{\tau}_2\&\bar{1}) = H_0$
$(\tau_1\&A_1)$ | $v \ (H_1\&A_0) = H_1$
$(\tau_1\&A_2\&A_1)$ | $v \ (H_2\&\bar{A}_0\&\bar{1}) = H_2$
$(\tau_1\&A_3\&A_2\&\bar{A}_1)$ | $v \ (H_3\&\bar{A}_0\&\bar{1}) = H_3$
$(\tau_1\&A_4\&A_3\&\bar{A}_2\&\bar{A}_1)$ | $v \ (H_4\&\bar{A}_0\&\bar{1}) = H_4$
$(\tau_1\&A_5\&A_4\&\bar{A}_3\&\bar{A}_2\&\bar{A}_1)$ | $v \ (H_5\&\bar{A}_0\&\bar{1}) = H_5$ For the counters of FIGURES 2 and 3, the number of inputs for the setting stages of the main and auxiliary stores increases from counter stage to counter stage. In order that the Gray code counter may be constructed with identical counter stages—which is of practical importance inasmuch as it allows the use of modular units—signals $\vartheta$ are introduced which have the following functions:

$$A_0 = \vartheta_1$$
$$A_1\&\bar{A}_0 = \vartheta_2$$
$$A_2\&\bar{A}_1\&\bar{A}_0 = \vartheta_3$$
$$A_3\&\bar{A}_2\&\bar{A}_1\&\bar{A}_0 = \vartheta_4$$
$$A_4\&\bar{A}_3\&\bar{A}_2\&\bar{A}_1\&\bar{A}_0 = \vartheta_5$$

These signals $\vartheta$ can be formed in separate AND-circuits or, as shown in FIGURES 10a through 10e, in OR/NOT-circuits.

Figure 4:
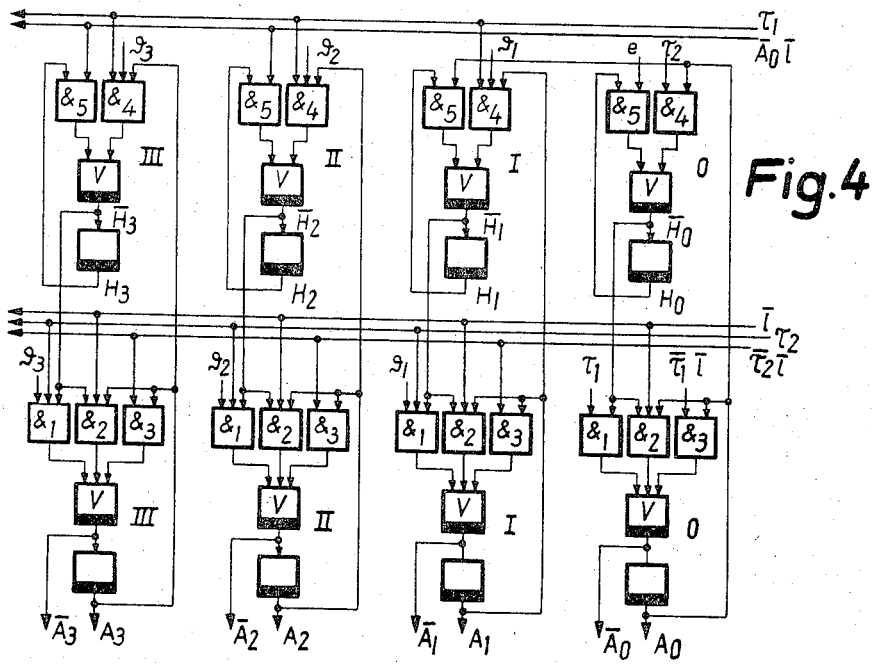
FIGURE 4 is a schematic circuit diagram showing still another embodiment of a forward counting Gray code counter in accordance with the present invention, the same including identical counter stages.

Thus, when the $\vartheta$-signals are used, the setting conditions will have the following logic functions:

For the main stores | For the auxiliary stores
--- | ---
$A_1: (\tau_2\&\vartheta_1\&\bar{H}_1)$ | $H_1: (\tau_1\&\vartheta_1\&A_1)$
$A_2: (\tau_2\&\vartheta_2\&\bar{H}_2)$ | $H_2: (\tau_1\&\vartheta_2\&A_2)$
$A_3: (\tau_2\&\vartheta_3\&\bar{H}_3)$ | $H_3: (\tau_1\&\vartheta_3\&A_3)$
$A_4: (\tau_2\&\vartheta_4\&\bar{H}_4)$ | $H_4: (\tau_1\&\vartheta_4\&A_4)$
$A_5: (\tau_2\&\vartheta_5\&\bar{H}_5)$ | $H_5: (\tau_1\&\vartheta_5\&A_5)$ FIGURE 4 shows four counter stages of a Gray code counter incorporating identical counter stages, this counter having been derived from the counter of FIGURE 3. It will be noted that the number of inputs of the setting stages remains limited to 3. The auxiliary store of the lowest-order counter stage also has the signal $e$ applied to it, the same having either of the following two logic functions $$A_0 v(\tau_2\&\bar{1}) = e \text{ or } 1 \ v \ (\tau_2\&\bar{A}_0) = \bar{e}$$

produced, for example, by the circuits of FIGURES 11a and 11b, respectively. When this signal e is used, the $H_0$ store will have the following logic function:

$$(\tau_2 \& A_0) v (H_0 \& e) = H_0$$

The holding stages of all of the other stores remain unchanged and are thus identical to the counter of FIGURE 3. In order to reduce the number of inputs to the counter stages, certain ones of the signals may be combined with each other outside of the counter. For example, FIGURE 4 shows the signals $\bar{\tau}_2$ and $\bar{I}$, the signals $\bar{A}_0$ and $\bar{I}$, and the signals $\bar{\tau}_1$ and $\bar{I}$ as having been combined in separate AND-circuits (not shown).

In the case of the forward counting counters of FIGURES 2, 3 and 4, the A-signals of each counter stage are produced in stores comprising a setting stage $\&_1$ and two holding stages $\&_2$, $\&_3$, the H-signals being formed in the setting stages $\&_4$ and the holding stages $\&_5$.

A signal from counting stage 0 is applied to the setting stage $\&_1$ of the counter stage I; a signal from each of the counter stages 0 and I is applied to the setting stage $\&_1$ of the counter stage II; a signal from each of the counter stages 0, I and II is applied to the setting stage $\&_1$ of the counter stage III, and so on. Thus, each counter stage has applied to it at least one signal from each of the preceding, lower-order stages.

In the case of the forwarding counting counters of FIGURES 2, 3 and 4, the H-signals are formed in stores having a setting stage $\&_4$ and a holding stage $\&_5$. In the counters of FIGURES 2 and 3, the auxiliary stores of the counter stage 0 have two holding stages $\&_{5a}$ and $\&_{5b}$.

In order that the counters of FIGURES 2, 3 and 4 may, after the maximum count has been reached, once more begin to count from 0, 1, 2, 3 . . ., the logic function of the auxiliary store of the highest-order binary digit has to be appropriately modified.

Assuming the counter to be a five-digit counter, as per the time plot of FIGURE 1, the maximum count that can be reached is "31." The next counting step will therefore advance the counter to zero, which means that, in accordance with the time plot of FIGURE 1, the signal $A_4$ has to disappear. If, however, the counter stage IV which puts out the highest-order binary digit, namely, the signal $A_4$, were arranged to operate in accordance with the above logic function, the signal $A_4$ would not disappear at the desired moment, and the counter would proceed to count backwards. In order to avoid this, the signal $H_4$ which erases the $A_4$-store is produced at the instant indicated in the time plot. If, however, the logic functions were as indicated above, the signal $H_4$ would not appear until a later instant, and it is for this reason that the last counter stage is different. Accordingly, in the auxiliary store of the $n^{th}$ (i.e., the last) counter stage of a counter according to FIGURES 2 and 3, the input signal $A_{n-1}$, which is put out by the immediately preceding counter stage, is replaced by the negated signal $\bar{A}_{n-1}$. In the case of a counter according to FIGURE 4, the input signal $\mathfrak{s}_n$ is replaced by a signal $\mathfrak{s}_{n+1}$.

The present invention also includes the provision of a backward counting counter, i.e., a counter which, if originally set to its zero position, puts out the highest count with the next counting step (e.g.: the counter is originally set to "0," and the first counting step sets the counter to "31"), and then continues to count down until it reaches zero, whereupon it once more reaches a maximum count and again counts down.

Figure 5:
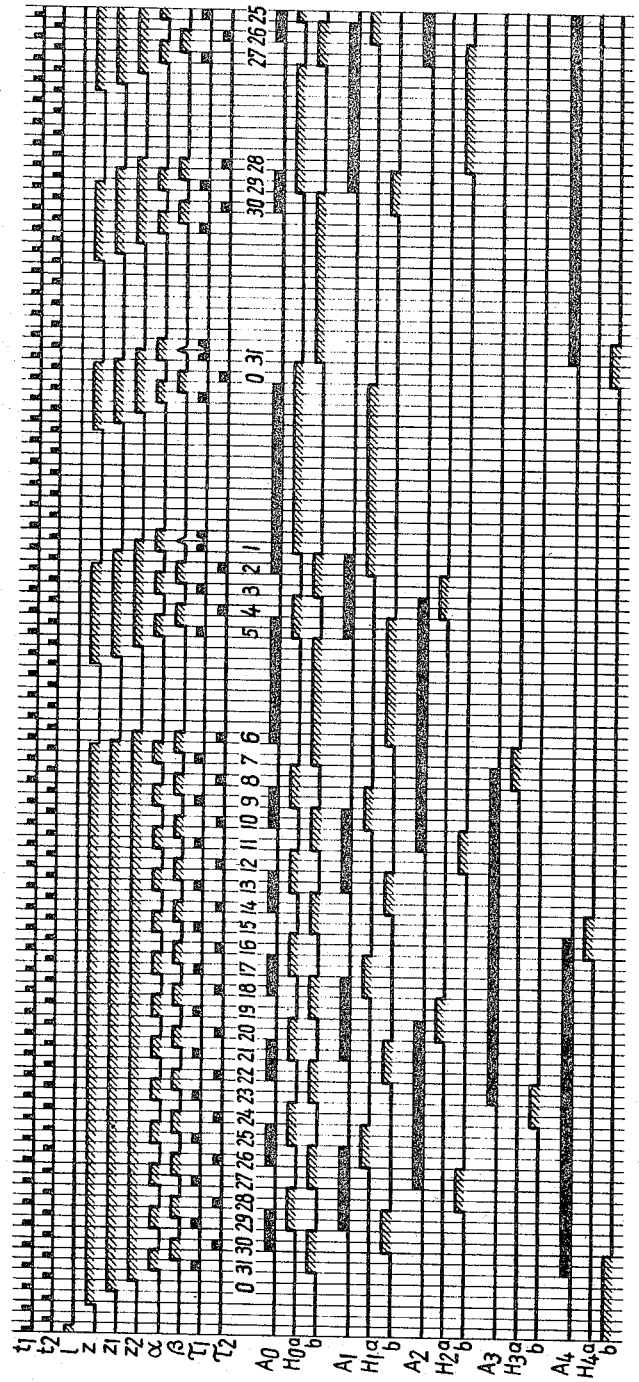
FIGURE 5 is a time plot showing the timed relationship between the various signals used to control a backward counting Gray code counter in accordance with the present invention, and the signals put out by the counter.

FIGURE 5 is a time plot showing the operation of a five-digit, backward counting Gray code counter. As is apparent from the time plot, the signals applied to the counter are the same as in the case of a forward counting counter, namely, the counting signals $t_1$, the auxiliary counting signals $t_2$, the output signals $\alpha$, $\beta$, of a divider stage and the signals $\tau_1$, $\tau_2$, derived from signals $\alpha$ and $\beta$. The maximum count of the five-digit counter is "31," which count appears after the count "0." Here, too, the purpose of the H-signals is to fix the instants at which the signals A appear and disappear, as in the case of the forward counting counter. The time plot of FIGURE 5 also shows two solutions (a) and (b), representing two sets of sequences of the signals H. In the case (a), the H-signal is 0 at the start of the corresponding A-signal and L at the end of this A-signal, while in the case (b) the H-signal is L at the start of the corresponding A-signal and 0 at the end thereof.

Figure 6:
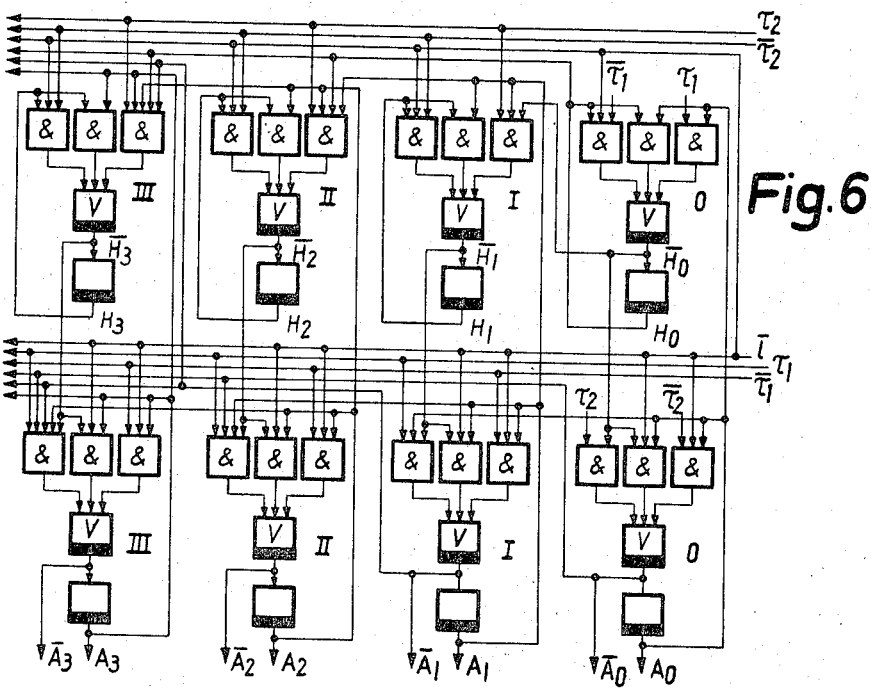
FIGURE 6 is a schematic circuit diagram showing one embodiment of a backward counting Gray code counter in accordance with the present invention.

FIGURE 6 is a backward counting Gray code counter which operates in according with the following logic functions:

| Setting condition | Holding condition | |
|---|---|---|
| $(\tau_2 \& \bar{H}_0)$ | $v\ (A_0 \& \bar{H}_0 \& \bar{I}) v (A_0 \& \bar{\tau}_2 \& \bar{I})$ | $= A_0$ |
| $(\tau_1 \& \bar{H}_1 \& A_0)$ | $v\ (A_1 \& \bar{H}_1 \& \bar{I}) v (A_1 \& \bar{\tau}_1 \& \bar{I})$ | $= A_1$ |
| $(\tau_1 \& \bar{H}_2 \& A_1 \& \bar{A}_0)$ | $v\ (A_2 \& \bar{H}_2 \& \bar{I}) v (A_2 \& \bar{\tau}_1 \& \bar{I})$ | $= A_2$ |
| $(\tau_1 \& \bar{H}_3 \& A_2 \& \bar{A}_1 \& \bar{A}_0)$ | $v\ (A_3 \& \bar{H}_3 \& \bar{I}) v (A_3 \& \bar{\tau}_1 \& \bar{I})$ | $= A_3$ |
| $(\tau_1 \& \bar{H}_4 \& A_3 \& \bar{A}_2 \& \bar{A}_1 \& \bar{A}_0)$ | $v\ (A_4 \& \bar{H}_4 \& \bar{I}) v (A_4 \& \bar{\tau}_1 \& \bar{I})$ | $= A_4$ |
| $(\tau_1 \& A_0)$ | $v\ (H_0 \& A_0) v (H_0 \& \bar{\tau}_1 \& \bar{I})$ | $= H_0$ |
| $(\tau_2 \& A_1 \& \bar{H}_0)$ | $v\ (H_1 \& A_1) v (H_1 \& \bar{\tau}_2 \& \bar{I})$ | $= H_1$ |
| $(\tau_2 \& A_2 \& \bar{A}_1 \& H_0)$ | $v\ (H_2 \& A_2) v (H_2 \& \bar{\tau}_2 \& \bar{I})$ | $= H_2$ |
| $(\tau_2 \& A_3 \& \bar{A}_2 \& \bar{A}_1 \& H_0)$ | $v\ (H_3 \& A_3) v (H_3 \& \bar{\tau}_2 \& \bar{I})$ | $= H_3$ |
| $(\tau_2 \& A_4 \& \bar{A}_3 \& \bar{A}_2 \& \bar{A}_1 \& H_0)$ | $v\ (H_4 \& A_4) v (H_4 \& \bar{\tau}_2 \& \bar{I})$ | $= H_4$ |

In order that the counter, after having reached the count "0," again starts to count backwards beginning from the maximum count, as represented in the time plot of FIGURE 5, the logic function of the last counter stage, not otherwise shown in detail, is modified. To this end, the input signal $A_{n-1}$ of the $n^{th}$ (last) counter stage of the main store, (i.e., the signal put out by the immediately preceding counter stage) is replaced, in the logic function, by the negated signal $\bar{A}_{n-1}$.

Figure 7:
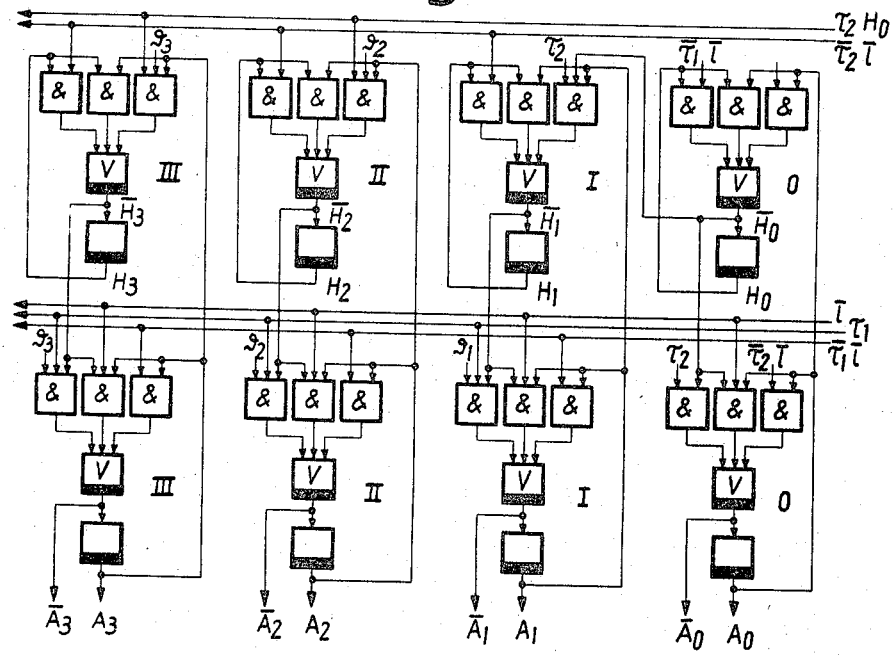
FIGURE 7 is a schematic circuit diagram showing another embodiment of a backward counting Gray code counter in accordance with the present invention.

If the backward counting counter is to be constituted of identical counter stages, this may be done by utilizing the above-mentioned $\mathfrak{s}$ signals, which simplifies the setting conditions as follows:

For $A_1$: $(\tau_1 \& \bar{H}_1 \& \vartheta_1)$
For $A_2$: $(\tau_1 \& \bar{H}_2 \& \vartheta_2)$   For $H_2$: $(\tau_2 \& H_0 \& A_2 \& \vartheta_2)$
For $A_3$: $(\tau_1 \& \bar{H}_3 \& \vartheta_3)$   For $H_3$: $(\tau_2 \& H_0 \& A_3 \& \vartheta_3)$
For $A_4$: $(\tau_1 \& \bar{H}_4 \& \vartheta_4)$   For $H_4$: $(\tau_2 \& H_0 \& A_4 \& \vartheta_4)$ The backward counting counters of FIGURES 6 and 7 produce auxiliary signals in accordance with the case (a) depicted in the time plot of FIGURE 5.

FIGURE 8 shows a backward counting Gray code counter utilizing the signals $\mathfrak{s}$ and producing the auxiliary signals as shown under (b) in FIGURE 5; the logic functions of this counter are as follows:

| | | | |
|---|---|---|---|
| $(\tau_2 \& \bar{H}_0)\ v\ (A_0 \& \bar{\tau}_2 \& \bar{I})\ v\ (A_0 \& H_0 \& \bar{I})$ | | | $= A_0$ |
| $(\tau_1 \& H_1)\ v\ (A_1 \& \bar{\tau}_1 \& \bar{I})\ v\ (A_1 \& H_1 \& \bar{I})\ v\ (A_1 \& \bar{A}_0 \& \bar{I})$ | | | $= A_1$ |
| $(\tau_1 \& H_2)\ v\ (A_2 \& \bar{\tau}_1 \& \bar{I})\ v\ (A_2 \& H_2 \& \bar{I})\ v\ (A_2 \& \bar{\vartheta}_2 \& \bar{I})$ | | | $= A_2$ |
| $(\tau_1 \& H_3)\ v\ (A_3 \& \bar{\tau}_1 \& \bar{I})\ v\ (A_3 \& H_3 \& \bar{I})\ v\ (A_3 \& \bar{\vartheta}_3 \& \bar{I})$ | | | $= A_3$ |

| | | |
|---|---|---|
| $(\tau_1 \& \bar{A}_0)$ | $v\ (H_0 \& \bar{A}_0 \& \bar{I})\ v\ (H_0 \& \bar{\tau}_1 \& \bar{I})$ | $= H_0$ |
| $(\tau_2 \& \bar{A}_1 \& H_0)$ | $v\ (H_1 \& A_1 \& \bar{I})\ v\ (H_1 \& \bar{\tau}_2 \& \bar{I})$ | $= H_1$ |
| $(\tau_2 \& \bar{A}_2 \& \bar{H}_0 \& \vartheta_2)$ | $v\ (H_2 \& A_2 \& \bar{I})\ v\ (H_2 \& \bar{\tau}_2 \& \bar{I})$ | $= H_2$ |
| $(\tau_2 \& \bar{A}_3 \& \bar{H}_0 \& \vartheta_3)$ | $v\ (H_3 \& \bar{A}_3 \& \bar{I})\ v\ (H_3 \& \bar{\tau}_2 \& \bar{I})$ | $= H_3$ |

In order that the counter of FIGURE 8, after the same has reached the count 0, once again begins to count down from the maximum, the signal $A_{n-1}$, used for forming the signal $\mathfrak{s}_n$ in the $n^{th}$ (last) counter stage, may be replaced by the negated signal $\bar{A}_{n-1}$.

It will thus be seen that, in accordance with the present invention, there is provided a counter for counting forward or backward and controlled by timely staggered counting signals $\tau_1$ and auxiliary counting signals $\tau_2$, which counter comprises a plurality of counter stages each incorporating a main store and an associated auxiliary store which put out signals A and H, respectively, the instants at which each main store is set and erased being fixed by the associated auxiliary store with each auxiliary store being in one binary condition for setting the associated main store and in the opposite binary condition for erasing the associated main store, and by one of the following: at least one preceding counter stage, a counting signal and an auxiliary counting signal. The counter further comprises means interconnecting the main and auxiliary stores of each counter stage for causing, upon the application of one of the signals $\tau_1$, $\tau_2$, exactly one of the main stores to change its state.

It will be understood that the above description of the present invention is susceptible to various modifications, changes, and adaptations, and the same are intended to be comprehended within the meaning and range of equivalents of the appended claims.

What is claimed is:

1. In a static counter for counting forward or backward and controlled by timely staggered counting signals $t_1$ and auxiliary counting signals $t_2$ and having a plurality of counter stages each incorporating a main store and an associated auxiliary store which put out signals A and H, respectively, the instants at which each main store is set and erased being fixed by the associated auxiliary store with each auxiliary store being in one binary condition for setting the associated main store and in the opposite binary condition for erasing the associated main store, the improvement which comprises:

(a) means for connecting the input of each main store directly to its respective associated auxiliary store and to all of the preceding main stores; and (b) means for connecting the input of each auxiliary store to the respective associated main store, to at least all of the preceding main stores except the lowest-order store, and to the lowest-order auxiliary store.

2. A counter as defined in claim 1, further comprising a divider stage connected ahead of the input of the lowest-order counter stage and connected to receive said signals $t_1$ and $t_2$ for putting out signals $\alpha$, $\beta$, from which said signals $\tau_1$, $\tau_2$, are derived which are applied to the inputs of said stores, said signals $\tau_1$, $\tau_2$, appearing at twice the frequency of said signals $t_1$, $t_2$, and having time intervals between them.

3. A counter as defined in claim 2 wherein said divider stage has the following logic functions:

$$(t_1 \& z_2 \& \bar{\beta}) \; v \; (\alpha \& \bar{\beta} \& \bar{1}) \; v \; (\alpha \& \bar{t}_1 \& \bar{1}) = \alpha$$
$$(t_2 \& z_1 \& \alpha) \; v \; (\beta \& \alpha \& z_2) \; v \; (\beta \& \bar{t}_2 \& z_2) = \beta$$

where $\bar{1}$ is an erase signal, and where $$z_1 = (z \& t_1 \& \bar{1}) v (z_1 \& z \& \bar{1}) v (z_1 \& \bar{t}_1 \& \bar{1})$$
$$z_2 = (z_1 \& t_2) v (z_2 \& z_1) v (z_2 \& \bar{t}_2 \& \bar{1})$$

with $z$ being a counting command signal.

4. A counter as defined in claim 1 wherein the counter is a forward counting counter each of whose main and auxiliary stores comprise input setting and holding stages to whose outputs are connected two serially connected first and second NOT-stages, the output of said second NOT-stage being connected back to one of said input stages; and wherein said input stages of each main store are constituted by at least two AND-circuits and said input stages of each auxiliary store are constituted by at least three AND-circuits.

5. A counter as defined in claim 4 wherein said input stages of each main store are constituted by exactly three AND-circuits, wherein said input stages of each auxiliary store except the lowest-order auxiliary store are constituted by exactly two AND-circuits, and wherein input stages of said lowest-order auxiliary store are constituted by exactly three AND-circuits.

6. A counter as defined in claim 5 which counts forward and whose main stores have the following logic functions:

| | |
|---|---|
| $(\tau_1 \& \bar{H}_0)$ | $v \; (A_0 \& \bar{H}_0 \& \bar{1}) v (A_0 \& \bar{\tau}_1 \& \bar{1}) = A_0$ |
| $(\tau_2 \& H_1 \& A_0)$ | $v \; (A_1 \& \bar{H}_1 \& \bar{1}) v (A_1 \& \bar{\tau}_2 \& \bar{1}) = A_1$ |
| $(\tau_2 \& H_2 \& A_1 \& \bar{A}_0)$ | $v \; (A_2 \& \bar{H}_2 \& \bar{1}) v (A_2 \& \bar{\tau}_2 \& \bar{1}) = A_2$ |
| $(\tau_2 \& H_3 \& A_2 \& \bar{A}_1 \& \bar{A}_0)$ | $v \; (A_3 \& \bar{H}_3 \& \bar{1}) v (A_3 \& \bar{\tau}_2 \& \bar{1}) = A_3$ |
| $(\tau_2 \& H_4 \& A_3 \& \bar{A}_2 \& \bar{A}_1 \& \bar{A}_0)$ | $v \; (A_4 \& \bar{H}_4 \& \bar{1}) v (A_4 \& \bar{\tau}_2 \& \bar{1}) = A_4$ |
| $(\tau_2 \& H_5 \& A_4 \& \bar{A}_3 \& \bar{A}_2 \& \bar{A}_1 \& \bar{A}_0)$ | $v \; (A_5 \& \bar{H}_5 \& \bar{1}) v (A_5 \& \bar{\tau}_2 \& \bar{1}) = A_5$ | where $\tau_1$, $\bar{\tau}_1$, $\tau_2$, $\bar{\tau}_2$, are timely staggered and spaced signals derived from said counting and auxiliary signals $t_1$, $t_2$, $A_n$, $\bar{A}_n$ are the output signals of said main stores where $n = 0, 1, 2, 3 \ldots$, $H_n$, $\bar{H}_n$ are the output signals of said auxiliary stores where $n = 0, 1, 2, 3 \ldots$, and $\bar{1}$ is an erase signal.

7. A counter as defined in claim 5 which counts forward and whose auxiliary stores have the following logic functions:

| | |
|---|---|
| $(\tau_2 \& A_0)$ | $v \; (H_0 \& A_0) v (H_0 \& \bar{\tau}_2 \& \bar{1}) = H_0$ |
| $(\tau_1 \& A_1 \& \bar{H}_0)$ | $v \; (H_1 \& A_0) = H_1$ |
| $(\tau_1 \& A_2 \& A_1 \& \bar{H}_0)$ | $v \; (H_2 \& A_1) = H_2$ |
| $(\tau_1 \& A_3 \& A_2 \& \bar{A}_1 \& \bar{H}_0)$ | $v \; (H_3 \& A_2) = H_3$ |
| $(\tau_1 \& A_4 \& A_3 \& \bar{A}_2 \& \bar{A}_1 \& \bar{H}_0)$ | $v \; (H_4 \& A_3) = H_4$ |
| $(\tau_1 \& A_5 \& A_4 \& \bar{A}_3 \& \bar{A}_2 \& \bar{A}_1 \& \bar{H}_0)$ | $v \; (H_5 \& A_4) = H_5$ | where $\tau_1$, $\bar{\tau}_1$, $\tau_2$, $\bar{\tau}_2$, are timely staggered and spaced signals derived from said counting and auxiliary signals $t_1$, $t_2$, $A_n$, $\bar{A}_n$ are the output signals of said main stores where $n = 0, 1, 2, 3 \ldots$, $H_n$, $\bar{H}_n$ are the output signals of said auxiliary stores where $n = 0, 1, 2, 3 \ldots$, and $\bar{1}$ is an erase signal.

8. A counter as defined in claim 5 which counts forward and whose auxiliary stores have the following logic functions:

| | |
|---|---|
| $(\tau_1 \& A_0)$ | $v \; (H_0 \& A_0) v (H_0 \& \bar{\tau}_2 \& \bar{1}) = H_0$ |
| $(\tau_1 \& A_1)$ | $v \; (H_1 \& A_0 \& \bar{1}) = H_1$ |
| $(\tau_1 \& A_2 \& A_1)$ | $v \; (H_2 \& \bar{A}_0 \& \bar{1}) = H_2$ |
| $(\tau_1 \& A_3 \& A_2 \& \bar{A}_1)$ | $v \; (H_3 \& \bar{A}_0 \& \bar{1}) = H_3$ |
| $(\tau_1 \& A_4 \& A_3 \& \bar{A}_2 \& \bar{A}_1)$ | $v \; (H_4 \& \bar{A}_0 \& \bar{1}) = H_4$ |
| $(\tau_1 \& A_5 \& A_4 \& \bar{A}_3 \& \bar{A}_2 \& \bar{A}_1)$ | $v \; (H_5 \& \bar{A}_0 \& \bar{1}) = H_5$ | where $\tau_1$, $\bar{\tau}_1$, $\tau_2$, $\bar{\tau}_2$, are timely staggered and spaced signals derived from said counting and auxiliary signals $t_1$, $t_2$, $A_n$, $\bar{A}_n$ are the output signals of said main stores where $n = 0, 1, 2, 3 \ldots$, $H_n$, $\bar{H}_n$ are the output signals of said auxiliary stores where $n = 0, 1, 2, 3 \ldots$, and $\bar{1}$ is an erase signal.

9. A counter as defined in claim 4 wherein said input stages of each main store are constituted by exactly three AND-circuits and said input stages of each auxiliary store are constituted by exactly two AND-circuits.

10. A counter as defined in claim 9 which counts forward, whose main stores have the following logic functions:

| | | |
|---|---|---|
| $(\tau_1 \& \bar{H}_0)$ | $v \; (A_0 \& \bar{H}_0 \& \bar{1}) \; v \; (A_0 \& \bar{\tau}_1 \& \bar{1})$ | $= A_0$ |
| $(\tau_2 \& H_1 \& \vartheta_1)$ | $v \; (A_1 \& \bar{H}_1 \& \bar{1}) \; v \; (A_1 \& \bar{\tau}_2 \& \bar{1})$ | $= A_1$ |
| $(\tau_2 \& H_2 \& \vartheta_2)$ | $v \; (A_2 \& \bar{H}_2 \& \bar{1}) \; v \; (A_2 \& \bar{\tau}_2 \& \bar{1})$ | $= A_2$ |
| $(\tau_2 \& H_3 \& \vartheta_3)$ | $v \; (A_3 \& \bar{H}_3 \& \bar{1}) \; v \; (A_3 \& \bar{\tau}_2 \& \bar{1})$ | $= A_3$ |
| $(\tau_2 \& H_4 \& \vartheta_4)$ | $v \; (A_4 \& \bar{H}_4 \& \bar{1}) \; v \; (A_4 \& \bar{\tau}_2 \& \bar{1})$ | $= A_4$ | and whose auxiliary stores have the following logic functions:

$$(\tau_2\&A_0) \; v \; (H_0\&e) = H_0$$
$$(\tau_1\&A_1\&\vartheta_1) \; v \; (H_1\&A_0) = H_1$$
$$(\tau_1\&A_2\&\vartheta_2) \; v \; (H_2\&\overline{A}_0\&\overline{I}) = H_2$$
$$(\tau_1\&A_3\&\vartheta_3) \; v \; (H_3\&\overline{A}_0\&\overline{I}) = H_3$$
$$(\tau_1\&A_4\&\vartheta_4) \; v \; (H_4\overline{A}\,\overline{A}_0\&\overline{I}) = H_4$$

where $$A_0 \; v \; (\overline{\tau_2\&I}) = e$$
$$A_0 = \vartheta_1$$
$$A_1\&\overline{A}_0 = \vartheta_2$$
$$A_2\&\overline{A}_1\&\overline{A}_0 = \vartheta_3$$
$$A_3\&\overline{A}_2\&\overline{A}_1\&\overline{A}_0 = \vartheta_4$$

and where $\tau_1, \overline{\tau}_1, \tau_2, \overline{\tau}_2$, are timely staggered and spaced signals derived from said counting and auxiliary signals $t_1, t_2$, $A_n, \overline{A}_n$ are the output signals of said main stores where $n=0, 1, 2, 3 \ldots$, $H_n, \overline{H}_n$ are the output signals of said auxiliary stores where $n=0, 1, 2, 3 \ldots$, and $\overline{I}$ is an erase signal.

11. A counter as defined in claim 4 wherein said input stages of each main and auxiliary store are constituted by exactly three AND-circuits.

12. A counter as defined in claim 11 which counts backward, whose main stores have the following logic functions:

$$(\tau_2\&\overline{H}_0) \qquad v \; (A_0\&\overline{H}_0\&\overline{I})v(A_0\&\overline{\tau}_2\&\overline{I}) = A_0$$
$$(\tau_1\&\overline{H}_1\&A_0) \qquad v \; (A_1\&\overline{H}_1\&\overline{I})v(A_1\&\overline{\tau}_1\&\overline{I}) = A_1$$
$$(\tau_1\&\overline{H}_2\&A_1\&\overline{A}_0) \qquad v \; (A_2\&\overline{H}_2\&\overline{I})v(A_2\&\overline{\tau}_1\&\overline{I}) = A_2$$
$$(\tau_1\&\overline{H}_3\&A_2\&\overline{A}_1\&\overline{A}_0) \qquad v \; (A_3\&\overline{H}_3\&\overline{I})v(A_3\&\overline{\tau}_1\&\overline{I}) = A_3$$
$$(\tau_1\&\overline{H}_4\&A_3\&\overline{A}_2\&\overline{A}_1\&\overline{A}_0) \; v \; (A_4\&\overline{H}_4\&\overline{I})v(A_4\&\overline{\tau}_1\&\overline{I}) = A_4$$

and whose auxiliary stores have the following logic functions:

$$(\tau_1\&A_0) \qquad v \; (H_0\&A_0)v(H_0\&\overline{\tau}_1\&\overline{I}) = H_0$$
$$(\tau_2\&A_1\&\overline{H}_0) \qquad v \; (H_1\&A_1)v(H_1\&\overline{\tau}_2\&\overline{I}) = H_1$$
$$(\tau_2\&A_2\&A_1\&\overline{H}_0) \qquad v \; (H_2\&A_2)v(H_2\&\overline{\tau}_2\&\overline{I}) = H_2$$
$$(\tau_2\&A_3\&A_2\&\overline{A}_1\&\overline{H}_0) \qquad v \; (H_3\&A_3)v(H_3\&\overline{\tau}_2\&\overline{I}) = H_3$$
$$(\tau_2\&A_4\&A_3\&\overline{A}_2\&\overline{A}_1\&\overline{H}_0) \; v \; (H_4\&A_4)v(H_4\&\overline{\tau}_2\&\overline{I}) = H_4$$

where $\tau_1, \overline{\tau}_1, \tau_2, \overline{\tau}_2$, are timely staggered and spaced signals derived from said counting and auxiliary signals $t_1, t_2$, $A_n, \overline{A}_n$ are the output signals of said main stores where $n=0, 1, 2, 3 \ldots$, $H_n, \overline{H}_n$ are the output signals of said auxiliary stores where $n=0, 1, 2, 3 \ldots$, and $\overline{I}$ is an erase signal.

13. A counter as defined in claim 11 which counts backward, whose main stores have the following logic functions:

$$(\tau_2\&\overline{H}_0) \qquad v \; (A_0\&\overline{H}_0\&\overline{I}) \; v \; (A_0\&\overline{\tau}_2\&\overline{I}) = A_0$$
$$(\tau_1\&\overline{H}_1\&\vartheta_1) \; v \; (A_1\&\overline{H}_1\&\overline{I}) \; v \; (A_1\&\overline{\tau}_1\&\overline{I}) = A_1$$
$$(\tau_1\&\overline{H}_2\&\vartheta_2) \; v \; (A_2\&\overline{H}_2\&\overline{I}) \; v \; (A_2\&\overline{\tau}_2\&\overline{I}) = A_2$$
$$(\tau_1\&\overline{H}_3\&\vartheta_3) \; v \; (A_3\&\overline{H}_3\&\overline{I}) \; v \; (A_3\&\overline{\tau}_1\&\overline{I}) = A_3$$
$$(\tau_1\&\overline{H}_4\&\vartheta_4) \; v \; (A_4\&\overline{H}_4\&\overline{I}) \; v \; (A_4\&\overline{\tau}_1\&\overline{I}) = A_4$$

and whose auxiliary stores have the following logic functions:

$$(\tau_1\&A_0) \qquad v \; (H_0\&A_0) \; v \; (H_0\&\overline{\tau}_1\&\overline{I}) = H_0$$
$$(\tau_2\&A_1\&\overline{H}_0) \qquad v \; (H_1\&A_1) \; v \; (H_1\&\overline{\tau}_2\&\overline{I}) = H_1$$
$$(\tau_2\&A_2\&\overline{H}_0\&\vartheta_2) \; v \; (H_2\&A_2) \; v \; (H_2\&\overline{\tau}_2\&\overline{I}) = H_2$$
$$(\tau_2\&A_3\&\overline{H}_0\&\vartheta_3) \; v \; (H_3\&A_3) \; v \; (H_3\&\overline{\tau}_2\&\overline{I}) = H_3$$
$$(\tau_2\&A_4\&\overline{H}_0\&\vartheta_4) \; v \; (H_4\&A_4) \; v \; (H_4\&\overline{\tau}_2\&\overline{I}) = H_4$$

where $$A_0 = \vartheta_1$$
$$A_1\&\overline{A}_0 = \vartheta_2$$
$$A_2\&\overline{A}_1\&\overline{A}_0 = \vartheta_3$$
$$A_3\&\overline{A}_2\&\overline{A}_1\&\overline{A}_0 = \vartheta_4$$

and where $\tau_1, \overline{\tau}_1, \tau_2, \overline{\tau}_2$, are timely staggered and spaced signals derived from said counting and auxiliary signals $t_1, t_2$, $A_n, \overline{A}_n$ are the output signals of said main stores where $n=0, 1, 2, 3 \ldots$, $H_n, \overline{H}_n$ are the output signals of said auxiliary stores where $n=0, 1, 2, 3 \ldots$, and $\overline{I}$ is an erase signal.

14. A counter as defined in claim 4 wherein said input stages of each main store except the lowest-order main store are constituted by exactly four AND-circuits and said input stages of said lowest-order store and said input stages of each auxiliary store are constituted by exactly three AND-circuits.

15. A counter as defined in claim 14 which counts backward, whose main stores have the following logic functions:

$$(\tau_2\&H_0) \; v \; (A_0\&\overline{\tau}_2\&\overline{I}) \; v \; (A_0\&H_0\&\overline{I}) = A_0$$
$$(\tau_1\&H_1) \; v \; (A_1\&\overline{\tau}_1\&\overline{I}) \; v \; (A_1\&H_1\&\overline{I}) \; v \; (A_1\&\overline{A}_0\&\overline{I}) = A_1$$
$$(\tau_1\&H_2) \; v \; (A_2\&\overline{\tau}_1\&\overline{I}) \; v \; (A_2\&H_2\&\overline{I}) \; v \; (A_2\&\vartheta_2\&\overline{I}) = A_2$$
$$(\tau_1\&H_3) \; v \; (A_3\&\overline{\tau}_1\&\overline{I}) \; v \; (A_3\&H_3\&\overline{I}) \; v \; (A_3\&\vartheta_3\&\overline{I}) = A_3$$

and whose auxiliary stores have the following logic functions:

$$(\tau_1\&\overline{A}_0) \qquad v \; (H_0\&\overline{A}_0\&\overline{I}) \; v \; (H_0\&\overline{\tau}_1\&\overline{I}) = H_0$$
$$(\tau_2\&\overline{A}_1\&H_0) \qquad v \; (H_1\&\overline{A}_1\&\overline{I}) \; v \; (H_1\&\overline{\tau}_2\&\overline{I}) = H_1$$
$$(\tau_2\&\overline{A}_2\&H_0\&\vartheta_2) \; v \; (H_2\&\overline{A}_2\&\overline{I}) \; v \; (H_2\&\overline{\tau}_2\&\overline{I}) = H_2$$
$$(\tau_2\&\overline{A}_3\&H_0\&\vartheta_3) \; v \; (H_3\&\overline{A}_3\&\overline{I}) \; v \; (H_3\&\overline{\tau}_2\&\overline{I}) = H_3$$

where $$\delta_2 = A_1\&\overline{A}_0$$
$$\delta_3 = A_2\&\overline{A}_1\&\overline{A}_0$$

$\tau_1, \overline{\tau}_1, \tau_2, \overline{\tau}_2$, are timely staggered and spaced signals derived from said counting and auxiliary signals $t_1, t_2$, $A_n, \overline{A}_n$ are the output signals of said main stores where $n=0, 1, 2, 3 \ldots$, $H_n, \overline{H}_n$ are the output signals of said auxiliary stores where $n=0, 1, 2, 3 \ldots$, and $\overline{I}$ is an erase signal.

16. A counter as defined in claim 14 wherein the output signal $A_{n-1}$ from the next-to-last counter stage and applied to the last counter stage $n$ is replaced by the negated signal $\overline{A}_{n-1}$.

References Cited

UNITED STATES PATENTS 3,020,481   2/1962   Hulst _____ 235—92
3,264,455   8/1966   Gotz _____ 235—92

MAYNARD R. WILBUR, *Primary Examiner.*

G. J. MAIER, *Assistant Examiner.*